May 5, 1959 G. W. BISHOP 2,885,068
CLEANING AND DE-WAXING DEVICES FOR CONVEYORS
Filed March 26, 1956 2 Sheets-Sheet 1
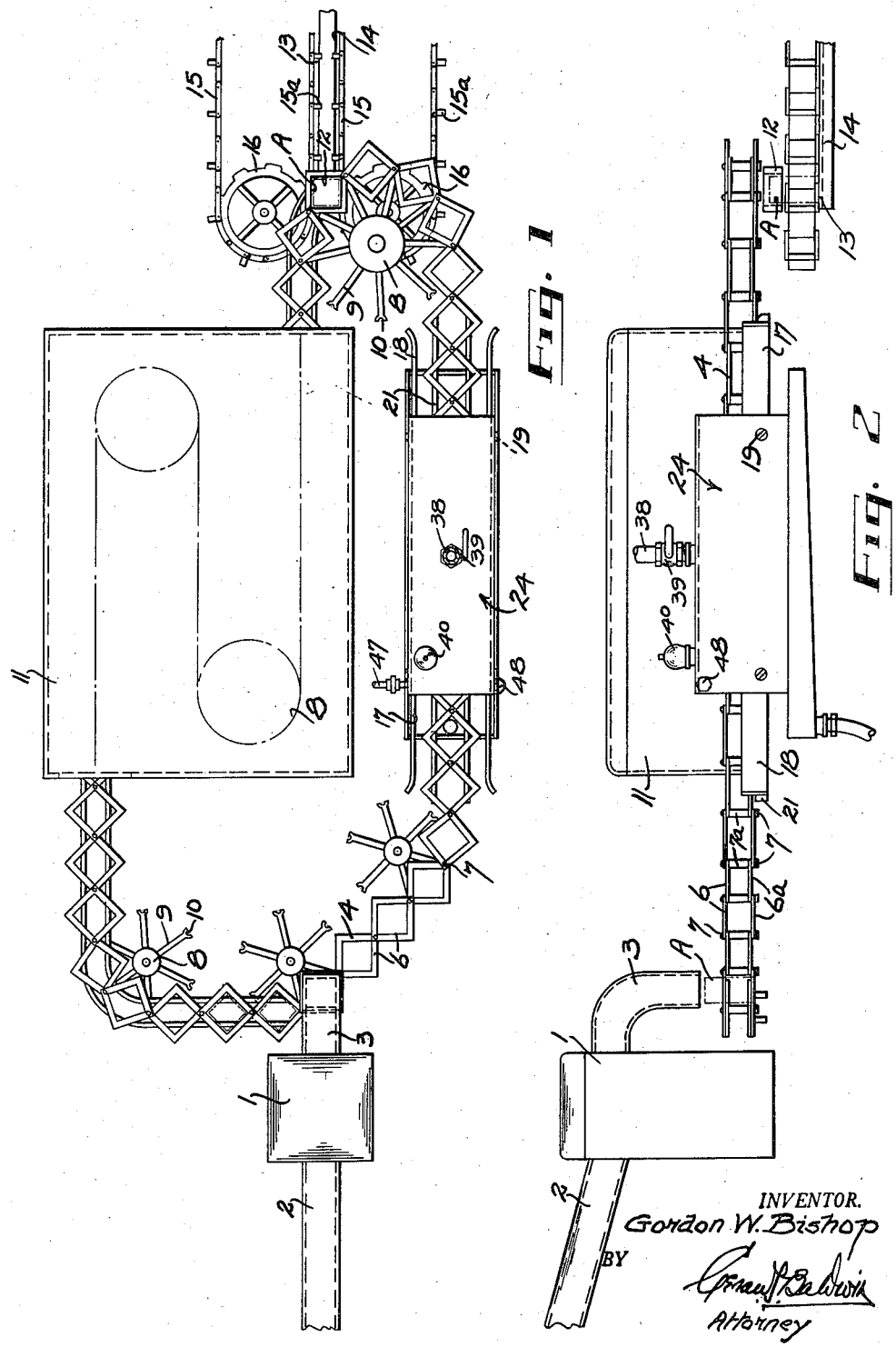
INVENTOR.
Gordon W. Bishop
BY
Attorney

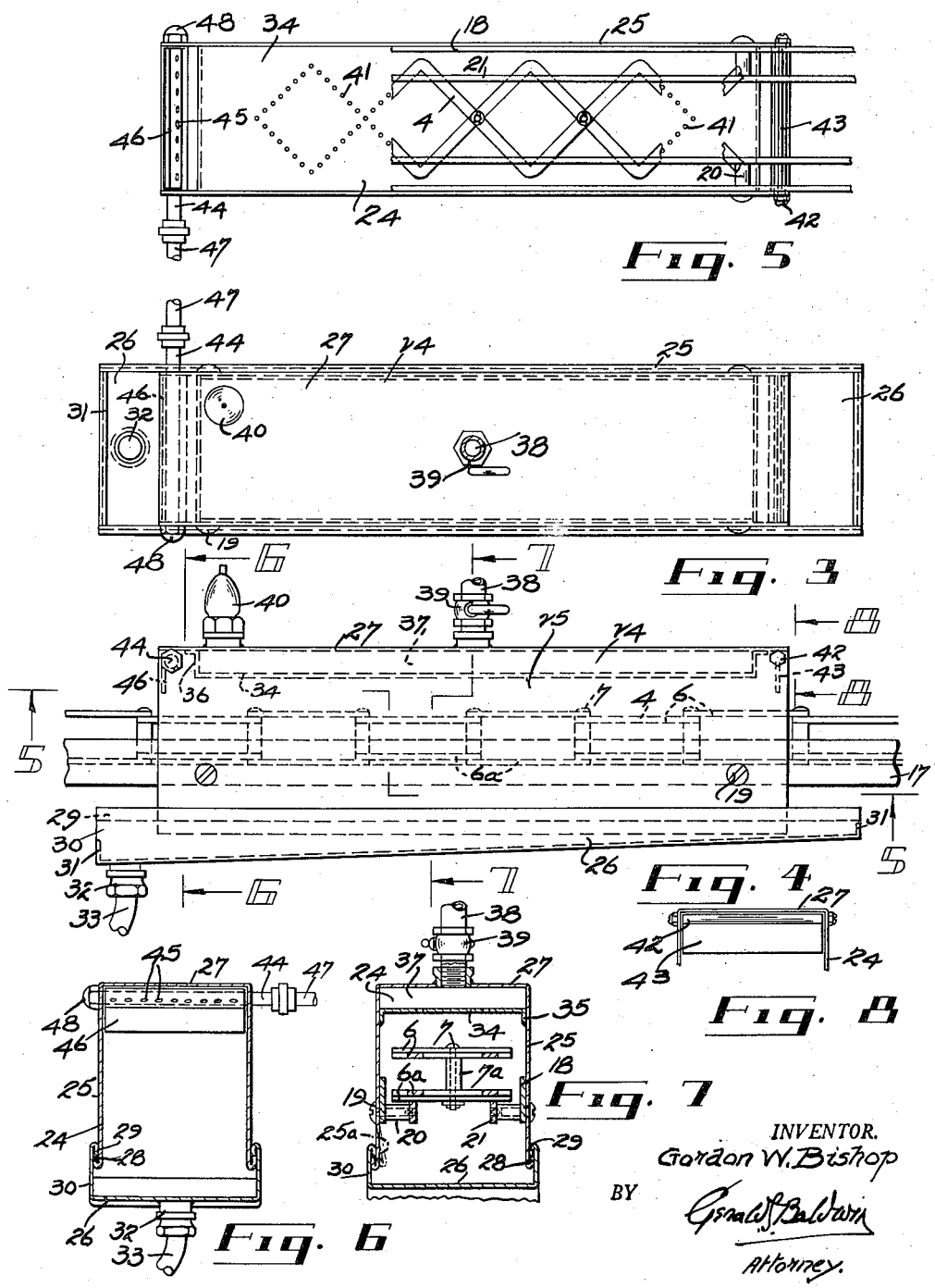

2,885,068

CLEANING AND DE-WAXING DEVICES FOR CONVEYORS

Gordon W. Bishop, Madison Heights, Mich.

Application March 26, 1956, Serial No. 573,813

2 Claims. (Cl. 198—229)

This invention relates to cleaning and de-waxing devices for conveyors. At the present time it is a common practice to dip cartons, in which such products as milk and cream are to be packed, into a waxing tank from which they are discharged onto a conveyor for transport through a cooling tank where the wax upon the cartons is set and hardened prior to their delivery to a filling station. As the cartons are discharged from the waxing tank a little wax from time to time drops onto the conveyor chain and also some wax drops thereonto from the freshly coated cartons. Consequently during its operation the chain gradually becomes coated with wax which, in order to maintain satisfactory operation, must be removed from time to time. At present this is largely done manually, however this is a slow, tedious operation, and, if performed while the chain is in motion, sometimes results in injury to the operator.

It is an object of the invention to provide a cleaning and de-waxing device for conveyors by which the chain may be cleaned and de-waxed during a single cycle of its operation.

Another object of the invention is to provide a cleaning and de-waxing device for conveyors including a tubular casing through which the chain travels, and means in the casing through which steam is discharged onto the chain as it passes therethrough to remove wax or any other foreign matter therefrom and discharge it into a trough which forms part of the underside of the casing.

A further object of the invention is to provide such a cleaning and de-waxing device for conveyors including means adjacent the outlet end of the casing for blowing air under pressure against the chain after it has been subjected to the steam to blow drops of condensation and any remaining particles of wax therefrom and also for cooling the chain.

Having thus briefly and broadly stated some of the objects and advantages of the invention, I will now describe an embodiment thereof with the aid of the accompanying drawings, in which:

Figure 1 is a plan view showing a diagram of a well known mechanism for waxing cartons, and the application of my conveyor cleaning and de-waxing device thereto, and Figure 2 is a side elevation thereof.

Figure 3 is an enlarged plan view of my invention, and

Figure 4 is a side elevation thereof, including a portion of a conveyor extending therethrough.

Figure 5 is a section on the line 5—5 of Figure 4, showing some of the apertures in the steam chamber and parts of the conveyor chain.

Figure 6 is a section on the line 6—6 of Figure 4 omitting the conveyor.

Figures 7 and 8 are sections on the lines 7—7 and 8—8, respectively, of Figure 4.

Referring first to Figures 1 and 2, 1 designates a waxing tank into which cartons are delivered through a passage 2. Extending from the tank 1 is a discharge chute 3 through which waxed cartons A are discharged one at a time for engagement by a conveyor chain 4. The chain includes vertically spaced upper and lower sections each consisting of a plurality of flat, hollow rectangular links 6 and 6a, respectively. The links 6 and the links 6a are arranged in overlapping relation, and extending vertically through the overlapping extremities of each pair of upper and lower links 6 and 6a is a pin 7 by which each upper link is retained at all times in vertical alignment with one of the lower links. Again all the upper links are maintained the same vertical distance above the lower links 6a by spacers 7a provided around the pins 7 as is more clearly seen in Figure 7. Mounted for rotation at suitable locations are sprockets 8, one of which is intermittently driven by means not shown. Each sprocket has a plurality of uniformly spaced radial arms 9 in the outer faces of which recesses 10 are formed to engage each pin 7 in turn as the chain travels.

11 denotes a cooling tank in which some of the sprockets 8 are mounted and around which the chain 4 passes. The cartons A are cooled during their passage through the cooling tank and their wax coatings are hardened. The intermittent movement of the chain 4 is such that during each pause one vertically aligned pair of links 6 and 6a is positioned to receive a carton from the discharge chute 3, and another pair of links 6 and 6a is positioned immediately above a delivery chute 12 (supported by means not shown) through which the carton carried by the last named pair of links drops onto a second conveyor 13 by which the cartons are carried to a filling station—not shown. The second conveyor includes a horizontal runway 14 along which cartons are moved by lateral projections 15a extending from two horizontally spaced, parallel chains 15 which pass around sprockets 16 two of which are shown.

After dropping the cartons A into the chute 12 the chain 4 travels back to and beneath the discharge chute 3, and during a part of that portion of its travel it moves over a supporting frame 17 which is suitably mounted on the machine—by means not shown. The frame 17 in this case, as is more clearly shown in Figures 4 and 7, consists of a guide rail 18 inwardly spaced from which by screws 19 having spacers 20 thereon are carrying rails 21. My cleaning and dewaxing device 24 is mounted on the supporting frame 17 which extends longitudinally therethrough.

The device, shown more particularly in Figures 3 to 8, inclusive, includes an elongated tubular casing formed in the present instance of an inverted channel-shaped member to the lower extremities of the side walls 25 of which the opposite longitudinal margins of a trough 26 are attached so that the latter is longitudinally inclined throughout its length while the top 27 of the casing is horizontal. The trough is also preferably longer than the side walls 25 and the top 27 of the casing and projects beyond both extremities of the latter.

In the present instance the lower longitudinal margins 28 of the side walls 25 are outwardly and upwardly folded upon themselves to receive and support inwardly and downwardly folded extremities 29 of upwardly bent longitudinal margins 30 of the trough 26; and in order to mount the trough at an inclination to the top 27 of the casing the height either of the margins 28 of the side walls 25 or the margins 30 of the trough 26 must increase uniformly throughout their length. In the present instance the margins 30 are shown of longitudinally increasing height from one extremity of the trough. While the side walls 25 normally lie in their positions shown and support the downturned extremities 29, these walls are sufficiently resilient adjacent their lower extremities to be forced inwardly as indicated at 25a (Figure 7) to release the trough and permit its removal. The transverse extremities of the trough upturned at 31, and extending downwardly through the trough adjacent its lower extremity is a suitable drain connection 32 from which a flexible tube 33 extends.

Spaced beneath the top 27 of the casing is a plate 34 having its longitudinal margins 35 downturned and welded or otherwise suitably secured to the inner faces of the side walls 25. The plate 34 extends throughout the major portion of the length of the casing and its extremities are upwardly folded as shown at 36 and welded to the inner face of the top 27. The space thus defined between the plate 34 and the top 27 forms a steam chamber 37 into which steam is delivered through a suitable connection 38 mounted in the top 27 of the casing, and 39 denotes a valve in the connection 38. A conventional safety valve 40 may also be mounted in an opening formed through the top 27. The plate 34 is perforated as shown at 41 and the pattern of these perforations preferably conforms to the outline of the opposed face of the chain 4, so that steam discharged through the perforations is blown directly down onto the chain during each temporary pause of the latter. Moreover to achieve this result the casing must be longitudinally correctly positioned on the supporting frame 17. By the provision of the steam chamber 37 heat is generated in the casing to soften the wax and render it more readily removable by the steam ejected through the perforations 41.

Having its opposite extremities supported in the side walls 25 immediately beneath the top 27 adjacent the shallow end of the casing is a pin 42 on which a flap 43 is mounted for rotation; and having its extremities mounted in the side walls 25 immediately beneath the top adjacent the deep end of the casing is a pipe 44 having perforations 45 formed therein which are inwardly and downwardly directed. Mounted for rotation around the pipe 44 and normally leaving the perforations 45 uncovered is a second flap 46 which depends from the said pipe. Connected to one extremity of the pipe 44 is a compressed air line 47 and the opposite extremity of the said pipe is plugged at 48.

Thus throughout substantially its entire travel through the casing steam is discharged against the chain 4 through the perforations 41, and prior to leaving the casing compressed air is also discharged against it from the perforations 45 which not only blows drops of water and particles of melted wax from the chain but also dissipates some of the heat imparted to it by the steam. The flaps 43 and 46 permit the passage of damaged or defective cartons which have not dropped through the chute 12 to travel freely through the casing should such a condition arise, and they also minimize the escape of wax laden steam and condensation from the device. Obviously by opening the steam valve 39 and allowing compressed air to flow through the pipe 44 the device may be rendered operative at any time during the operation of the conveyor, and the chain quickly rendered wax free. Moreover it is understood that the device may be applied for cleaning conveyor chains in other types of machines wherein the chains are liable to be rendered dirty with material other than wax.

While in the foregoing the preferred embodiment of the invention has been described and shown, it is understood that alterations and modifications may be made thereto, provided the said alterations and modifications fall within the scope of the appended claims.

What I claim is:

1. In a cleaning and de-waxing device for conveyor chains, comprising an elongated casing open at the ends to provide a conveyor chain pathway, a partition wall in the upper portion of said casing extending between the sides thereof and terminating in wall portions connected to the upper wall of the casing adjacent the ends thereof to form a closed steam chamber extending throughout the major portion of the length of the casing for heating the interior thereof, said partition wall being provided with a series of perforations arranged above the conveyor chain pathway to discharge steam downwardly against the conveyor chain and remove wax therefrom, and a perforated pipe extending transversely at one end of said casing arranged between one of the end walls of said steam chamber and the exit end of said casing to direct air downwardly over said conveyor chain as it emerges from said casing to cool said chain and remove condensation therefrom.

2. In a cleaning and de-waxing device for conveyor chains, comprising an elongated casing open at the ends to provide a conveyor chain pathway and including detachably connected upper and lower sections, a partition wall in the upper section of said casing extending between the sides thereof and terminating in vertical wall portions connected to the upper wall of said casing in spaced relation from the ends thereof to form a closed steam chamber extending throughout the major portion of the length of the casing for heating the interior thereof, said partition wall being provided with a series of perforations arranged above the conveyor chain pathway to discharge steam downwardly against the conveyor chain and remove wax therefrom, and a perforated pipe extending transversely in the upper portion of said casing arranged to discharge jets of air downwardly over said chain as it emerges from said casing to remove condensation therefrom and to cool said chain as it leaves said casing, said lower section of said casing being provided with return bent upper edges adapted to interlockingly engage return bent edges on the upper portion of said casing to provide a removable collection trough adapted to be readily removed for the purpose of cleaning residual matter removed from said chain.

References Cited in the file of this patent

UNITED STATES PATENTS

| 1,235,027 | Harrison | July 31, 1917 |
| 1,380,563 | Keebler | June 7, 1921 |
| 1,788,364 | Gies | Jan. 6, 1931 |
| 2,266,309 | Cohen | Dec. 16, 1941 |
| 2,271,436 | Lathrop | Jan. 27, 1942 |
| 2,382,619 | Earp | Aug. 14, 1945 |
| 2,633,437 | Detjen | Mar. 31, 1953 |